United States Patent [19]

Hellnick

[11] 4,244,068
[45] Jan. 13, 1981

[54] METHOD AND APPARATUS FOR MACHINING PIPE COLLARS

[75] Inventor: Dieter H. Hellnick, Houston, Tex.

[73] Assignee: Jo-Way Tool Company, Inc., Houston, Tex.

[21] Appl. No.: 19,515

[22] Filed: Mar. 12, 1979

[51] Int. Cl.³ .......................... B23G 1/04; B23G 1/22
[52] U.S. Cl. .................................................. 10/101 R
[58] Field of Search .................. 10/101, 102; 82/5; 408/1, 36, 118, 218, 219, 222

[56] References Cited

U.S. PATENT DOCUMENTS

| 1,958,530 | 5/1934 | Bogart | 10/128 |
| 3,262,140 | 7/1966 | Takagi et al. | 10/101 |

FOREIGN PATENT DOCUMENTS

| 556562 | 8/1932 | Fed. Rep. of Germany | 10/101 |
| 613765 | 5/1935 | Fed. Rep. of Germany | 10/101 |

Primary Examiner—Ervin M. Combs

[57] ABSTRACT

A method and apparatus for machining pipe collars having internally tapered coaxial threads is accomplished by providing spaced sets of threading teeth on one side of a tool support bar of the numerically controlled machine with the spaced sets of threading teeth being oriented in generally parallel relation with the longitudinal axis of the tool support bar. The spaced sets of threaded teeth are then moved through the rotating collar by the tool support bar, following the desired internal taper with the orientation of the sets of thread forming teeth remaining substantially parallel with the axis of the tool support bar and the tool support bar being maintained in substantially parallel relation with the axis of the collar being formed. The sets of threading teeth form respective ones of the threaded tapers while the opposite set of thread forming teeth trace but remain clear of the thread being formed.

7 Claims, 5 Drawing Figures

METHOD AND APPARATUS FOR MACHINING PIPE COLLARS

FIELD OF THE INVENTION

This invention relates generally to machining operations pertaining to the manufacture of internally threaded pipe collars having tapered, coaxial threads and, more specifically, is directed to improved apparatus and method of manufacture whereby both of the opposed tapered threads are formed as the thread forming tool is moved in unidirectional manner through the collar or workpiece being rotated by the machine.

BACKGROUND OF THE INVENTION

In the manufacture of internally threaded, tapered pipe collars such as are typically utilized in the petroleum industry for pipe or tubing strings that are suspended within petroleum producing wells, it is necessary that the pipe collars be of quite accurate manufacture. For example, the opposed internally tapered threads must be coaxial within very close tolerances in order that the pipe sections joined by the coupling will be coaxial and can be readily suspended within the well without interference with other pipe structures. It is also mandatory that the opposed internally tapered thread forms have a high degree of coincidence and registry one with the other. The taper, pitches and thread forms must be accurately maintained within very close tolerance limits because it is necessary that the threaded pipe joints form a positive, leak proof seal to prevent escape of gas or liquid petroleum products from the tubing string into other portions of the well being produced. Where such tubing or pipe is employed in conventional surface supported or buried service for pipeline operations, obviously, it is desirable that the threads of the couplings and pipe joints be machined with sufficient accuracy that positive leak free type joints will be developed simply by joining pipe sections by means of couplings.

The machining of pipe couplings is a highly competitive commercial operation and machine time, labor and material savings are given careful consideration. Moreover, the complexity and productivity of the machining operation itself can quite easily enhance or materially interfere with commercially acceptable manufacture of pipe collars.

THE PRIOR ART

In the past, machines and machining operations have been designed specifically for the manufacture of accurately machined pipe collars with emphasis toward machining operations that accomplish machining and threading of both internal tapers within necessitating indexing or rechucking of the work piece during different stages of manufacture. For example, U.S. Pat. Nos. 1,958,503 of Bogart and 3,262,140 of Takagi et al both show machine tool devices for machining internally tapered couplings. The Bogart patent shows a machine mechanism incorporating a pair of tool support bars that are moved linearly through a coupling that is positioned in angular relation to the path of tool movement. Machining and threading of respective tapers is accomplished by tools supported by respective ones of the pairs of tool support bars. The bars themselves are indexed 90° for machining or threading operations. In the case of Takagi et al, opposed threading tools are supported by a bar that is also angularly oriented with respect to the collar being machined. One thread form is defined by one of the threading elements as the tool support bar is moved to the center of the coupling and then the tool support bar is shifted laterally to bring the opposite threading element into engagement with the opposite internal side of the coupling to define the other tapered thread form.

Neither of the machining and threading machines and methods disclosed by the above patents are widely used at this time in the manufacture of couplings for the reason that the mechanism required to accomplish such machining operations is extremely complex, quite expensive and frequently yields less than satisfactory results. It is desirable, therefore, to provide a method and apparatus for the manufacture of internally threaded couplings wherein the machine tools are of limited complexity from the standpoint of operation and machining and threading operations can be carried out with minimum labor and handling.

At the present time, typical manufacture of internally tapered type couplings is accomplished by a machining and threading machine having an indexing chuck. The indexing chuck supports the work piece and, after one of the machinings and/or threading operations is formed to define one of the tapered threads of the coupling, the work piece is rotated 180° by the indexing chuck thereby exposing the opposite end of the collar for machining and threading operations thereon. One of the problems with utilizing machines of this nature is that coincidence and coaxial relation between the internal opposed threads of the coupling are difficult to maintain within the limited tolerance range required by the industry. Moreover, the indexing chuck mechanism is quite expensive and, therefore, detracts from the commercial feasibility of pipe collar manufacture. Also, the machinist in charge of machining operations must expend a good deal of labor in machining and handling operations and thus, labor costs for such machining operations also adversely affect the commercial feasibility of such collar manufacture.

It is therefore a primary feature of the present invention to provide a novel machining and thread forming mechanism that promotes machining of both opposed tapered internal threads of pipe collars without the necessity for providing an indexing chuck for support of the work.

It is also a feature of the present invention to provide a novel mechanism for machining pipe collars wherein both of the internal opposed tapered threads of the collar can be formed while a thread forming tool is being moved through the collar in one direction.

It is a further feature of the present invention to provide a novel mechanism for machining pipe collars wherein the collar being machined can be rotated in unidirectional manner and both opposed internally tapered threads of the collar can be formed without necessitating reversal of collar rotation at the midpoint of thread forming operations.

Among the several features of the present invention is noted the contemplation of a novel mechanism for manufacturing internally threaded pipe collars wherein spaced sets of thread forming teeth may be moved through the collar in a manner tracing the desired taper of the threads being formed with the sets of threading teeth forming respective ones of the threaded tapers while the opposite set of threading teeth trace but remain clear of the thread being formed.

Another feature of this invention promotes the development of a novel mechanism for machining pipe collars that enables registry, coincidence and aligning of the opposed internal thread forms of the collars to be maintained quite easily within narrow tolerance limits.

It is a further feature of this invention to provide a novel collar machining mechanism that is capable of functioning with less manufacturing time, less handling, better quality output and increased productivity as compared to that available with machines and methods for manufacturing collars at the present time.

Other and further objects, features and advantages of this invention will become obvious to one skilled in the art upon an understanding of the illustrative embodiments about to be described, and various advantages, not referred to herein, will occur to one skilled in the art upon employment of the invention in practice.

SUMMARY OF THE INVENTION

In one form of the invention, a numerically controlled machine is provided having at least one tool support bar, supporting a tool having the capability of forming the opposed internally tapered surfaces of the coupling to be subsequently internally threaded. The numerically controlled machine will also include at least one tool support bar that is oriented in substantially axial alignment with the axis of the collar to be internally threaded and is capable of being maintained in substantially parallel relation with the axis of the coupling during thread forming operations. The threading tool support bar is provided with at least one tool receptacle, within which is positioned one or more thread forming tool elements in such manner that spaced sets of thread forming teeth are positioned by the support bar in thread forming position relative to the inside tapered surface of the collar to be threaded. During threading operations the threading tool is fed into a rotating coupling by the tool support bar, with the spaced sets of threading teeth of the tool being maintained in substantially parallel relation with the axis of the coupling. As the threading tool is moved along the internal taper of the coupling, the first set of teeth have thread cutting engagement with one of the tapered surfaces of the coupling and the second set of teeth trace but remain clear of the threads cut by the first set of threading teeth. After reaching the center of the coupling, the tool support bar moves the second set of teeth along the taper of the opposite side of the coupling. While the second set of teeth are cutting the opposite tapered thread, the first set of teeth trace but remain clear of the thread cut by the second set of teeth.

BRIEF DESCRIPTION OF THE DRAWINGS

In order that the manner in which the above recited advantages and features of the present invention are attained, as well as others which will become apparent can be understood in detail, a more particular description of the invention briefly summarized above may be had with reference to the specific embodiments thereof which are illustrated in the appended drawings, which drawings form a part of this specification. It is to be understood, however, that the appended drawings illustrate only typical embodiments of the invention and, therefore, are not to be considered limiting of its scope, for the invention may admit to other equally effective embodiments.

In the Drawings.

DETAILED DESCRIPTION OF PREFERRED EMBODIMENTS

Figure 1:
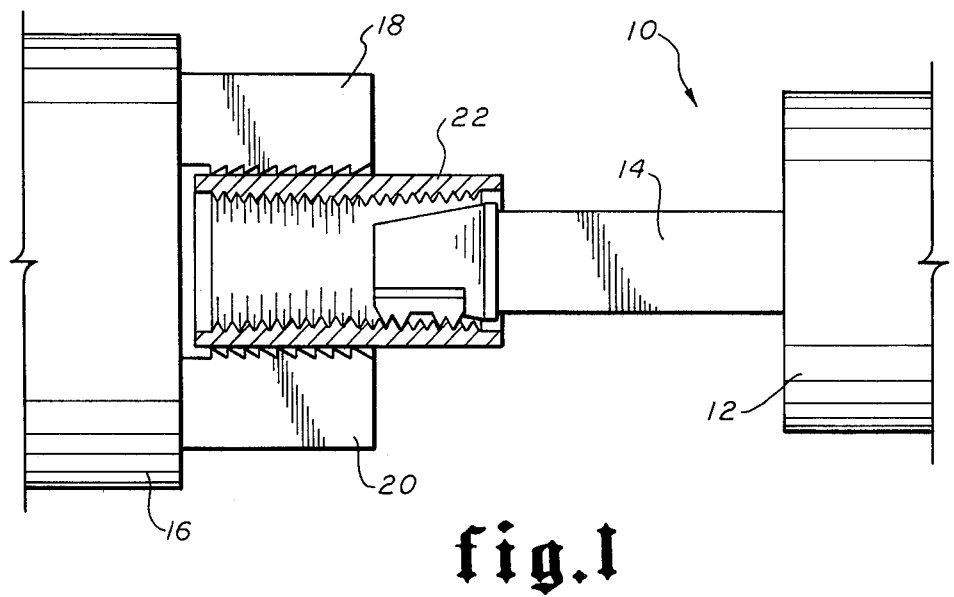
FIG. 1 is a partially schematic view of a machine having a movable tool support bar and having a rotatable chuck capable of supporting and rotating a work piece, such as a pipe collar, for machining and threading operations within the scope of the present invention.

Referring now to the drawings and first to FIG. 1, a machine is illustrated generally at 10 having a tool bar support structure 12 that is capable of supporting a tool bar 14 for omnidirectional movement. One suitable machine capable of providing the necessary tool movement for accomplishing internal threading of pipe couplings is a commercially available numerically controlled machine, typically referred to as an N-C machine. The N-C machine 10 incorporates a conventional chuck mechanism 16 having jaws 18-20 that are capable of providing positive support for a work piece 22, such as a pipe coupling, that is being machined and internally threaded from tubular stock. The chuck 16 is rotated in conventional manner thereby rotating the work piece or collar 22 while the tool bar 14 is moved in accordance with a predetermined computer program thereby causing a tool carried by the cutter bar 14 to engage the inner surfaces of the work piece and form desired machined surfaces.

As mentioned above, in most cases internally threaded collars are manufactured by first forming the threads of a first internal taper of the threaded collar, then reversing the collar by means of an indexing mechanism and subsequently machining and forming the threads at the opposite extremity of the collar. It is desirable to conduct the machining and threading operations without indexing the work piece and without reversing the direction of rotation thereof, thus promoting simplicity of machining operations and reducing the amount of handling that is otherwise necessary during manufacture of pipe collars.

Figure 2:
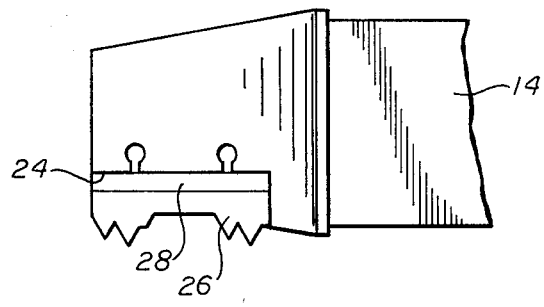
FIG. 2 is a partial view of a tool support bar supporting a thread forming tool that is formed in accordance with the present invention.

Referring now particularly to FIG. 2, the cutter tool support bar 14 is formed to define a tool recess 24 within which is located a thread forming tool 26 that is specifically designed so as to be capable of forming both of the tapered threads within a collar without indexing the collar during machining operations. The thread forming or cutting tool 26 is maintained within the recess 24 by means of a tool locking element 28.

Figure 3:
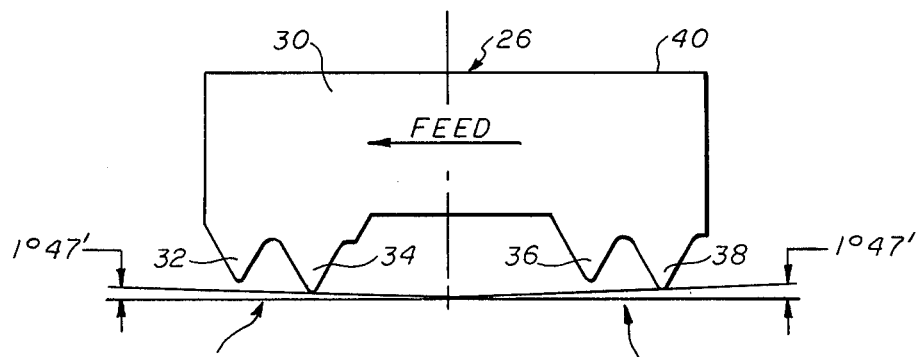
FIG. 3 is a sectional view of a pipe collar being internally threaded with a thread cutting tool formed in accordance with the present invention being positioned within the pipe cutter and showing the position of the thread forming tool during cutting of tapered threads at each side of the pipe collar.

Referring now to FIG. 3, the threaded cutting tool 26 may take the form shown for the purpose of cutting a thread of a particular taper. Obviously, cutter element 26 may take other suitable forms depending on the particular characteristics of the thread to be cut within a particular coupling. In the petroleum industry, one popular type of pipe coupling will be machined, having internal opposed tapered threads at each extremity thereof. The taper of these threads in one form of coupling is 1° 47'. As shown in FIG. 3, the cutter is formed in such manner as to define spaced pairs of thread forming teeth. These pairs of thread forming teeth will be referred to herein as "thread forming Pair A" and "thread forming Pair B." In the direction of tool movement, as shown by the feed arrow, the Pair A of thread forming teeth will engage the work piece first and then will be followed by the second pair of thread forming teeth B which will subsequently engage the inner portion of the work piece and form the second internally tapered thread. Machining of the internally tapered threads of the work piece will be described in detail hereinbelow.

Referring again to FIG. 3, on the left side of the body 30 of the threading tool 26 the Pair A of threading teeth are defined by a rough cut threading tooth 32 and a finish cut threading tooth 34. As the threading tool 26 is moved in the direction of the feed arrow, teeth 32 and 34 will provide roughing and finishing thread cutting action. Although a thread could be formed in a single pass of the threading tool 26 within the work piece, single pass forming is not ordinarily accomplished. Tool life and thread accuracy are most efficient when light machining cuts are taken and the threading tool is moved over the work piece a number of times. It should also be borne in mind that although thread forming teeth 32 and 34 are shown to be integral with the body structure 30 of the threading tool, it is not intended to so limit the invention, it being obvious that hardened thread forming teeth, such as carbide teeth, may be attached to a tool body within the spirit and scope of this invention.

On the right hand portion of the cutter body 30, the second pair of thread forming teeth B are defined by a rough cut tooth 36 and a finish cut tooth 38. Teeth 36 and 38 function in the same manner as teeth 32 and 34 of tooth Pair A, but are oriented in such manner relative to the tool body 30 that threaded Pair B properly form one of the internally tapered threads of the work piece. Thread forming teeth 32 and 34 of thread forming Pair A are also oriented in such manner that one of the tapered threads of the work teeth or coupling is properly and accurately formed while the threading tool 26 is maintained in stabilized manner by the tool support or cutter bar 14.

Figure 4:
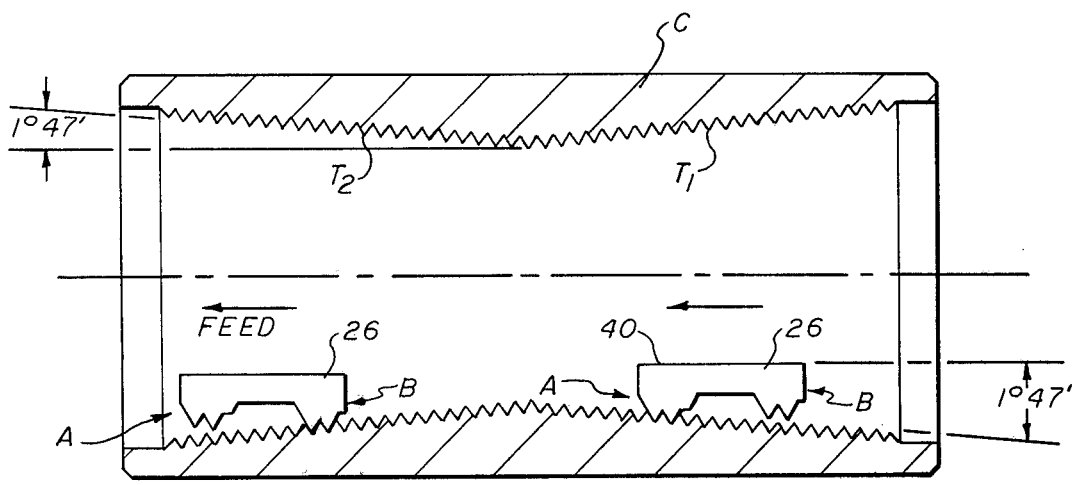
FIG. 4 is a view illustrating a thread cutting tool that is constructed in accordance with the teachings of the present invention.

Referring now to FIG. 4, there is shown a sectional view of a work piece such as a pipe coupling C to be machined. The pipe coupling is supported by the chuck of the machine and is rotated with its longitudinal axis being in coaxial relation with the axis of rotation of the chuck. For purposes of simplicity, the thread forming tool 26 is shown at two thread forming positions within the work piece or collar C and the cutter bar structure ordinarily supporting the thread forming tool 26 is not shown in order that the thread forming activity may be more readily understood.

As shown in FIGS. 3 and 4, the upper surface of the thread forming tool 26 defines a substantially planar surface 40 that, for purposes of this explanation, can be considered a line. If an imaginary line were drawn in such manner as to touch the finish thread forming teeth 34 and 38, that imaginary line would be substantially parallel to line or surface 40. Moreover, if a second imaginary line were drawn in such manner as to touch the extremities of roughing thread forming teeth 32 and 36 that imaginary line would also be substantially parallel to line or surface 40. As shown in FIG. 4, line 40 of the thread forming tool 26 is disposed in substantially parallel relation with the center-line or axis of the collar C being machined. For this reason, imaginary lines touching the pairs of roughing teeth and the pairs of finishing teeth will also be disposed in substantially parallel relation with the longitudinal axis of the work piece. By maintaining the pairs of roughing and finishing teeth in substantially parallel relation with the longitudinal axis of the collar, the thread forming operation can be completed in several thread forming passes, each thread forming pass being accomplished by unidirectional movement of the thread forming tool 26 completely through the collar C. As the thread forming tool 26 is moved through the collar during thread cutting operations, initial cutting will be accomplished by the first thread Pair A in cutting engagement with the first tapered surface T1 within the collar. Simultaneously, thread forming Pair B will trace the threads cut by thread Pair A but will remain clear of the threads by virtue of the position of thread Pair B relative to the tapered thread being cut. For example, where the taper of the internal threads of the collar is 1° 47', the clearance between the noncutting finish tooth of a pair and the thread being traced may be in the order of 0.024 inches. As long as during the next pass the next thread forming cut stays below 0.024 inches, a clearance will be maintained between the noncutting thread and the thread being cut by the opposite thread forming pair. For example, a typical cut during a thread forming pass will be in the order of 0.015 inches, thus maintaining adequate clearance between the noncutting thread forming teeth and the thread previously cut.

While the thread forming tool 26 is maintained at all times with surface or line 40 in substantially parallel relation with the axis of the collar C, the machine imparting movement to the tool support bar 14, i.e. a numeric controlled machine, the tool support bar will be moved in such manner that the thread forming teeth traverse the particular taper desired for the internal threads of the coupling. For example, thread forming Pair A will be moved linearly along an incline of 1° 47' in order to form one of the internal tapered threads of a typical coupling. Obviously, thread forms of other tapers may also be machined by similar thread forming tools within the spirit and scope of this invention. The particular angle of taper will be controlled only by the particular characteristics of pitch, angle and form of the threads being cut.

After the internal taper T1 has been completed, the N-C machine or other suitable machine will impart opposite tapered linear movement of the cutter 26 in such manner that thread Pair B is caused to engage and form the internal threads of threaded taper T2. In this case, thread Pair B will be in cutting engagement with the inner surface of the coupling while thread Pair A will trace but remain clear of the thread previously cut by thread Pair B. After thread forming Pair B has traversed completely through tapered thread T2, the tool support bar 14 will be shifted laterally in such manner as to clear the tapered threads and the tool support bar will then be retracted to the original position thereof. As mentioned above, the thread forming tool 26 will be moved through the coupling with a number of thread forming passes until the completed internally tapered threads are fully machined to the final form thereof.

Although each of the sets of thread forming teeth A and B include only two teeth in each set, i.e. a roughing tooth and a finish thread forming tooth, it is not intended to limit the present invention to any particular number of teeth. It is obvious, however, that the addition of three or more teeth will shorten the distance between the teeth and will thus lessen the amount of possible clearance toward critical limits, depending upon the degree of thread taper, pitch, form, etc.

Figure 5:
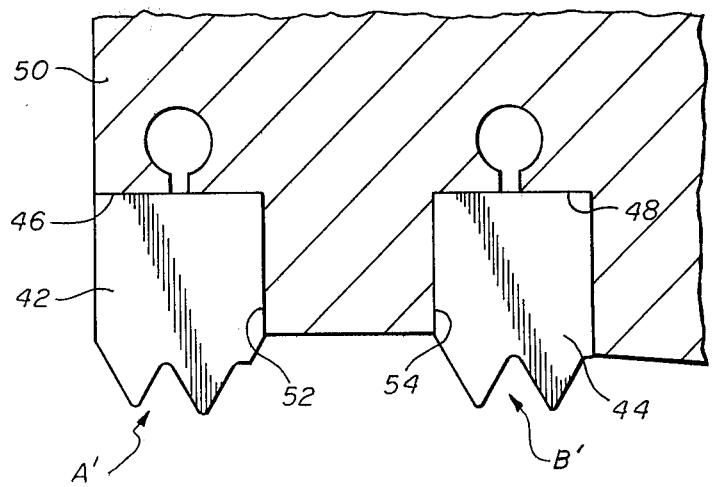
FIG. 5 is a partial view of a threading tool support bar having assembled thereto a pair of thread cutter elements constructed and positioned in accordance with the teachings of this invention.

Although the threading tool is illustrated in FIGS. 1-4 as being a unitary element with integral thread forming teeth, it is not intended to limit the invention as such. As illustrated in FIG. 5, the invention may also take another form where the tool is comprised of two tool sections 42 and 44 that are adapted to be retained within tool recesses 46 and 48 formed within a tool support bar 50. The recesses 46 and 48 are so spaced by shoulder surfaces 52 and 54 of the tool support bar that thread cutting tooth pairs or sets shown generally at A¹ and B¹ are properly positioned in spaced relation for accurate cutting of internal coupling threads in the manner described above. The configuration of the recesses 46 and 48 cooperate with the thread tool segments to establish proper angular orientation of the threading tooth sets according to the characteristics of the tapered threads to be formed. Moreover, the tooth sets may contain any desired number of teeth for achievement of proper threading.

In view of the foregoing, it is clearly apparent that I have provided a method and apparatus for machining threads in tubular elements, such as couplings, which does not necessitate the use of an indexing chuck and, therefore, renders the method and apparatus more commercially feasible through maintenance of low cost machining operations. Moreover, machining time is effectively saved for reasons that less handling is involved in machining operations and there is no necessity to reverse the direction of work piece rotation during machining operations. Moreover, in view of the fact that both internally tapered threads of a coupling can be formed with simple linear passes of a thread forming tool through the work piece, it is obvious that the lead of both threads can be maintained precisely, thus providing better quality output during manufacture of the collar product. It is therefore clear that the present invention accomplishes all of the objects and features hereinabove set forth together with other features that will be obvious from an understanding of the apparatus itself.

What is claimed is:

1. A method of producing internally threaded pipe couplings having coaxial, oppositely tapered first and second threaded surfaces, said method comprising:
   providing first and second spaced sets of thread forming teeth facing in the same direction;
   supporting said first and second sets of thread forming teeth in fixed relation to each other by a threading tool support bar;
   moving said support bar to bring one of said sets of thread forming teeth into engagement with a first one of the tapered internal surfaces of said coupling while rotating said coupling;
   moving said one set of thread forming teeth along said first tapered surface, said second set of thread forming teeth tracing the thread formed by said first set of thread forming teeth and maintaining a clearance therewith;
   upon completion of a linear pass of said first set of thread forming teeth along said first tapered surface of said coupling, bringing said second set of thread forming teeth with said second tapered surface at the central portion of said coupling;
   moving said second set of thread forming teeth in thread cutting relation along said second tapered surface, said first set of thread forming teeth tracing and maintaining a clearance with the threads formed by said second set of thread forming teeth;
   said sets of thread forming teeth being fixed to said support bar so that an imaginary line touching the crests of at least one of said teeth of each of said first and second sets of thread forming teeth is maintained in a fixed position, substantially parallel relation with the longitudinal axis of the rotating collar being threaded during machining of threads on both of said first and second tapered surface; and
   maintaining the depth of cut of the second set of thread forming teeth along said second tapered surface to be less than the clearance of the first set of thread forming teeth with said second tapered surface.

2. The method of claim 1, wherein:
   said first and second sets of thread forming teeth are defined on a single thread forming tool; and
   a tool support bar is moved by a machine and provides support for said single thread forming tool.

3. The method of claim 1, wherein:
   said first and second sets of thread forming teeth are each defined by first and second thread forming tools; and
   a tool support bar supports said first and second thread forming tools on one side thereof and provides machine controlled movement of said thread forming tools.

4. The method of claim 1 wherein each set of thread forming teeth has a forward rough cutting tooth and a rearward finish cutting tooth, an imaginary line touching the crests of the finishing teeth lying radially outwardly of but parallel to an imaginary line touching the crests of the rough cutting teeth.

5. In combination with a machine capable of omnidirectional movement of machining tools and having means for rotating a collar or the like to be internally threaded;
   a tool support bar carried by said machine for said omnidirectional movement, said tool support bar being formed to define tool support surface means on one side thereof;
   thread forming tool means fixedly mounted on said tool support surface means and presenting spaced sets of thread forming teeth facing in the same direction on one side of said tool support bar, one of said sets of thread forming teeth cutting an internally tapered thread in a pipe collar and the other set of thread forming teeth being provided for cutting an oppositely tapered internal thread in said collar, said sets of thread forming teeth being fixed to said support bar so that an imaginary line touching the crests of at least one of said teeth of each of said first and second sets of thread forming teeth is maintained in a fixed position, substantially parallel relation with the longitudinal axis of the rotating collar being threaded during machining of threads on both of said first and second tapered surface; and said machine, further including means for simultaneously moving said tool means through said collar in a single pass causing one set of thread forming teeth to cut one of the tapered threads while the opposite one of the sets of teeth trace and maintain a clearance with the tapered thread cut by said one set of thread forming teeth and then causing said second set of thread forming teeth to cut the second tapered thread while the first set of thread forming teeth trace and maintain a clearance with the thread form being cut by the second set of thread forming teeth and to further maintain the depth of cut of said second set of thread forming teeth to be less than the clearance of said one set of thread cutting teeth.

6. In the combination of claim 6, wherein each of said sets of thread forming teeth comprises:
at least one forward rough cut tooth;
at least one rearward finish cut tooth;
said sets of thread forming teeth being fixed to said support bar so that a first imaginary line touching the crests of said rough cut teeth is maintained in substantially parallel relation with the longitudinal axes of said threading tool support bar and said longitudinal axis of a collar being rotated by said machine; and
a secondary imaginary line touching the crests of said finish cut teeth is also maintained in substantially parallel relation with the longitudinal axes of said threading tool support bar and said longitudinal axis of a collar being rotated by said machine and radially outwardly of said first imaginary line.

7. In the combination of claim 5, wherein said thread forming tool means comprises:
a pair of thread forming tool elements, one of said thread forming tool elements defining one of said sets of thread forming teeth and the other of said thread forming tool elements defining the other of said sets of thread forming teeth.

* * * * *